United States Patent [19]

Ogawa et al.

[11] 3,751,599

[45] Aug. 7, 1973

[54] MAGNETIC HEAD HAVING MULTIPLE HEAD CORES

[75] Inventors: Hiroshi Ogawa, Yokohama; Toshi Suzuki, Kamakura; Tadashi Suzuki, Yamato; Mitsuaki Tanaka, Fujisawa, all of Japan

[73] Assignee: Victor Company of Japan Ltd., Kanagawa-ku, Yokohama-City, Kanagawa-Ken, Japan

[22] Filed: Nov. 22, 1971

[21] Appl. No.: 200,787

[30] Foreign Application Priority Data

Nov. 24, 1970 Japan .............................. 45/103960
Dec. 31, 1970 Japan .............................. 45/138684
Feb. 26, 1971 Japan .............................. 46/11279

[52] U.S. Cl...................179/100.2 C, 179/100.2 RE, 340/174.1 F

[51] Int. Cl. .............................................. G11b 5/28

[58] Field of Search........... 179/100.2 C, 100.2 RE; 340/174.1 F

[56] References Cited

UNITED STATES PATENTS

| | | | |
|---|---|---|---|
| 2,561,338 | 7/1951 | Camras | 179/100.2 C |
| 2,736,776 | 2/1956 | Camras | 179/100.2 C |
| 2,674,660 | 4/1954 | Ambrose | 179/100.2 RE |
| 3,414,971 | 12/1968 | Boehme | 179/100.2 C |
| 3,564,153 | 2/1971 | Kronfeld | 179/100.2 C |
| 3,590,168 | 6/1971 | Gooch | 179/100.2 C |

*Primary Examiner*—J. Russell Goudeau
*Attorney*—Holman & Stern

[57] ABSTRACT

A multi-head core magnetic head comprises at least one head core having a gap of a relatively large gap width and at least two other head cores having gaps of gap width respectively smaller than that of said one head core. The at least two other head cores are disposed at positions at which they can trace a track made by the at least one head core on the magnetic tape and distances between the gap of the at least one head core and the respective gaps of the at least two other head cores are different from each other. These head cores are integrally assembled in a single shield case.

4 Claims, 9 Drawing Figures

MAGNETIC HEAD HAVING MULTIPLE HEAD CORES

BACKGROUND OF THE INVENTION

This invention relates to a magnetic head having multiple head cores and, more particularly, to a multi-head core magnetic head having at least three head cores assembled in a single shield case.

PRIOR ART

As a delay apparatus for obtaining a delay signal, an apparatus utilizing a principle of propagation of sound by using a pipe and an apparatus utilizing magnetic recording and reproduction by using a rotary magnetic disc and a magnetic head have been employed. The former conventional apparatus, however, tends to become large because a pipe of about 14 meters in length, for example, is required for obtaining a signal having a delay time of 40 milli-sec. Furthermore, this apparatus is disadvantageous in that a good frequency characteristic cannot be obtained. The latter conventional apparatus is also disadvantageous in that it requires much work for finishing and assembling with a resulting high cost of manufacture in case of a non-contact type in which a magnetic head and a magnetic disc are not in contact with each other because a degree of flatness of the magnetic disc influences the level change, whereas in case of a contact type the disc tends to wear quickly and produce wow and flutter.

To eliminate the above described disadvantages of the known delay apparatus, a delay apparatus using a magnetic head and a magnetic tape has been proposed and used. This kind of delay apparatus in which a plurality of delay signals are obtained by using a magnetic tape and magnetic heads comprises an erasing magnetic head, a recording magnetic head and a plurality of reproducing magnetic heads which are separately aligned in a row along the advancing direction of the magnetic tape. According to this apparatus, a signal recorded on the magnetic tape by means of the recording magnetic head is sequentially reproduced by the plurality of reproducing magnetic heads aligned in a row. Therefore, a plurality of delay signals having different delay times can be obtained. However, each magnetic head used in this apparatus has its own shield case to store its head core therein, and, accordingly, each such head has a certain magnitude. Consequently, the distance between the gaps of the head cores of the magnetic heads cannot be made small beyond a certain value, no matter how each magnetic head may be made compact. If, for example, a relatively short delay time of 40 milli-sec. is to be obtained, the running speed of the magnetic tape must be made considerably large. The excessively large tape speed shortens the lives of both magnetic tape and magnetic head. Further, the drive source for the tape and the delay apparatus itself tend to become large, requiring more trouble in maintenance. Moreover, in order to maintain the head cores exactly in parallel with each other, the apparatus requires an extremely troublesome adjustment of the position of each head core. If the parallelism between each core is even slightly disturbed, a frequency characteristic, particularly that in high frequencies, is deteriorated due to azimuth loss of the head core.

There has been used a different kind of magnetic head in which one recording head core and one reproducing head core are assembled in a single shield case to trace the same track so as to reproduce a recorded signal immediately for monitoring. This magnetic head, however, is incapable of obtaining a plurality of delay signals having different delay times.

OBJECTS AND SUMMARY OF THE INVENTION

It is therefore, a general object of the invention to provide novel and useful magnetic head multiple head cores through which a plurality of delay signals having different delay times can be obtained. The magnetic head according to the invention is particularly useful in an echo machine, an apparatus for adding reverberation, a signal delaying apparatus for improving clarity of a speech given in an auditorium where a reflection of sound greatly affects the clarity and a multichannel stereo reproducing apparatus in which delay is given to a stereo signal system and the delayed signal is reproduced as a signal from a different channel.

Another object of the invention is to provide a magnetic head having multi-head cores in which at least one of three or more head cores assembled in a single shield case is used for recording and the rest of the head cores are used for reproduction, whereby a plurality of different delay signals which have a relatively short delay time even at a relatively low tape speed can be obtained.

A further object of the invention is to provide a magnetic head having multi-head cores which is of a relatively compact design and can constitute a low-cost magnetic delay apparatus adaptable to a conventional cartridge type tape recorder.

A still further object of the invention is to provide a magnetic head having multi-head cores in which gaps between each of three or more head cores assembled in a single magnetic head are accurately maintained in parallel with each other.

Other objects and features of the invention will become apparent from the description made hereinbelow with reference to the accompanying drawings, in which:

DETAILED DESCRIPTION OF THE EMBODIMENTS

Figure 1:
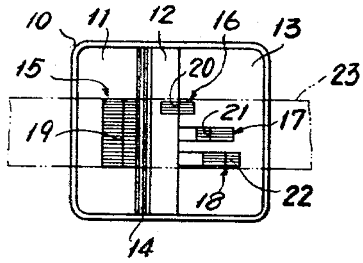
FIG. 1 is a front view showing a first embodiment of the multi-head core magnetic head according to the invention.

In FIG. 1, a shield case 10 made of permalloy contains core holder halves (hereinafter referred to as core holders) 11, 12 and 13 and a shield plate 14 held between the core holders 11 and 12. The core holder 11 holds a recording head core 15 which has a relatively wide gap width. The cores holders 12 and 13 hold a first channel reproducing head core 16 and the core holder 13 holds second and third channel reproducing head cores 17 and 18. The shield plate 14 magnetically and electrostatically shields the head core 15 from the head cores 16, 17 and 18 so as to prevent leakage of bias frequencies and leakage of a recorded signal to the reproducing head cores.

The recording head core 15 has a gap 19 of a gap width $g_1$ which is capable of making recording substantially across the whole width of a magnetic tape 23. The reproducing head cores 16, 17 and 18 respectively have gaps 20, 21 and 22 of gap widths $g_2$, $g_3$ and $g_4$. The distance between the outer sides of the cores 16 and 18 is made equal to or smaller than that between the outer sides of the core 19 so that each of the gaps 20, 21 and 22 traces the track formed by the gap 19 on the magnetic tape 23. The gaps 20, 21 and 22 are respectively disposed stepwisely in the advancing direction of the magnetic tape 23 so that the distance between each of the gaps 20, 21 and 22 and the gap 19 becomes greater in turn. If, accordingly, the magnetic tape 23 is run in the arrow direction, and a signal is recorded by the gap 19 of the recording head core 15 with a track having the width $g_1$ and is reproduced, in sequence, by the gaps 20, 21 and 22 of the reproducing head cores 16, 17 and 18, delay signals which have respectively different delay times relative to the signal recorded by the magnetic head core 15 are obtained from the reproducing head cores 16, 17 and 18 because the distances between the gap 19 and the gaps 20, 21 and 22 become gradually greater. The gaps 19, 20, 21 and 22 which are made by processes to be described later are disposed accurately parallel to each other.

In the present embodiment, the dimensions are as follows: $g_1 = 6.2$mm; $g_2 = g_3 = g_4 = 1.25$ mm; the distance between the outer sides of the head cores 16 and 18 = 6.0 mm; the distance between the gaps 19 and 20 = 4.5mm; the distance between the gaps 19 and 21 = 7.3 mm; the distance between the gaps 19 and 22 = 8.3 mm. As the magnetic tape 23, a magnetic tape having a width of ¼ inch is used. If the magnetic tape 23 is run at a velocity of 9.5 cm per sec. and a signal is recorded by the gap 19 and reproduced by the gaps 20, 21 and 22, delay signals having delay time of 47.4 m sec, 76.8 m sec and 87.3 m sec. are respectively obtained from the coils wound on the reproducing head cores 16, 17 and 18. The three kinds of delay signals having different delay times can be obtained by closing electrical circuits for the head cores 16, 17 and 18. If any one or two delay signals only are to be obtained, electrical circuit or circuits for the head core which corresponds to each desired delay time is selectively closed.

In the aforementioned embodiment, the head core 15 is used for recording whereas the head cores 16, 17 and 18 are used for reproduction. It is, however, possible to use the head cores 16, 17 and 18 as recording head cores and the head core 15 as a reproducing head core. In this case, the magnetic tape 23 is caused to run in a direction reverse to that of the arrow and a signal is recorded by operating the head core which corresponds to a desired delay time among the head cores 16, 17 and 18.

Figure 2:
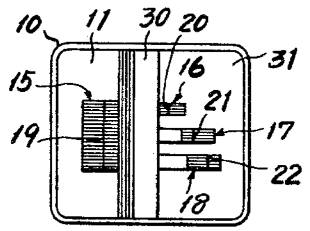
FIG. 2 is a front view showing a second embodiment of the multi-head core magnetic head according to the invention.

FIG. 2 shows a front view of a second embodiment of the magnetic head according to the invention. In FIG. 2, the same component parts as shown in FIG. 1 are designated by the same reference characters and the description thereof is therefore omitted. A core holder 30, different from the core holder 12 as shown in the above described first embodiment, is not formed with a recess and does not hold the head core 16. A core holder 31, different from the core holder 13 as shown in the above described first embodiment, is formed with a slightly deep recess to hold the head core 16. Consequently, the distance between the gaps 19 and 20 is slightly longer than that in the first embodiment. The construction and operation of the magnetic head of the second embodiment are entirely similar to the first embodiment except the point described above.

Figure 3:
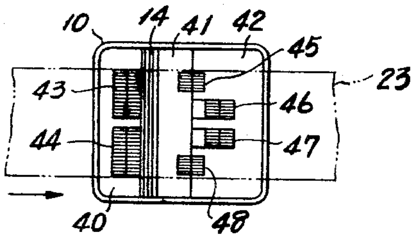
FIG. 3 is a front view of a third embodiment of the multi-head core magnetic head according to the invention.

FIG. 3 shows a front view of a third embodiment of the magnetic head according to the invention. A shield case 10 contains core holders 40, 41 and 42 and the shield plate 14. The core holder 40 holds recording head cores 43 and 44 which have aligned gaps respectively having relatively large gap width. The core holders 41 and 42 respectively hold reproducing head cores 45 and 48 and the core holder 42 holds reproducing head cores 46 and 47. The head cores 45 and 46 are disposed at positions at which they are spaced apart from each other in a direction along the gaps and at a different distance in a direction of the tape length from the head core 43. The head cores 45 and 46 can trace the track formed by the head core 43 on the magnetic tape 23. Similarly, the head cores 47 and 48 are disposed at positions at which they are spaced from each other and at different distances from the head core 44. The head cores 47 and 48 can trace the track formed by the head core 44 on the magnetic tape 23. The head cores 43 to 48 are held by the core holders 40 and 42 in such a manner that gaps of the head cores 43 to 48 are accurately disposed parallel to one another. In the present embodiment, the gaps of the head cores 45 and 48 are aligned and the gaps of the head cores 46 and 47 are also aligned. However, the relative positions of the gaps of the head cores 45 to 48 are not limited to this but they can be suitably determined in relation to a desired delay time.

According to the magnetic head of the present embodiment, different signals are recorded by the recording head cores 43 and 44 and reproduced by the reproducing head cores 45, 46 and 47, 48 respectively. It is accordingly possible in this embodiment to obtain two delay signals which have different delay times for each of the two different signals. If the magnetic tape 23 is caused to run in a direction reverse to that of the arrow, the head cores 45 to 48 can be used for recording and the head cores 43 and 44 for reproduction, as in the first embodiment.

Figure 4:
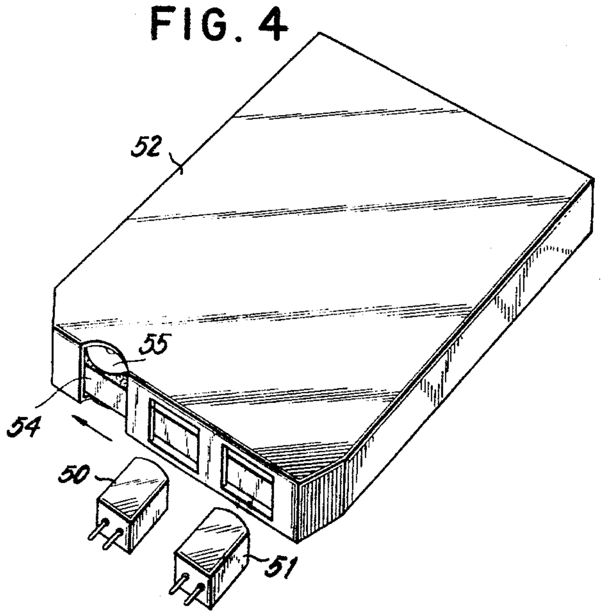
FIG. 4 is a perspective view showing an embodiment in which the magnetic head according to the invention is associated with a tape cartridge to form a magnetic delay apparatus.

One embodiment of a magnetic delay apparatus which comprises the magnetic head of the above described construction which cooperates with a tape cartridge is illustrated in FIG. 4. In a cartridge type tape recorder, a magnetic head 50 according to the present invention as shown in FIG. 1, 2 or 3 is used instead of a recording and reproducing magnetic head used in an ordinary tape recorder. An erasing magnetic head 51 is disposed at a position preceding the magnetic head 50. A cartridge 52 is a conventional type tape cartridge which contains a magnetic tape 54 and a pinch roller 55. Since the magnetic head according to the invention can be made in a very small size, a compact magnetic delay apparatus can be easily constructed with this magnetic head which cooperates with the cartridge in a cartridge type tape recorder.

Nextly, a method of manufacture of the first embodiment of the magnetic head according to the invention will be described with reference to FIGS. 5 to 8. First, a core half 15*a* shown in FIG. 5 on which windings 60 are wound is inserted into recessed portions 61*a* and 61*b* of the core holder 11. A core half 15*b* is pushed against the core half 15*a* through spacers 62*a* and 62*b*. The terminal ends of the windings 60 are connected to terminals (not shown) extending outside of the core holder 11. The position of the gap 19 formed between the core halves 15*a* and 15*b* through the spacer 62*a* is adjusted by means of a jig so that the gap 19 accurately runs parallel to abutting surfaces 63*a* and 63*b*. Then polyester resin is injected into the assembly and solidified to make the assembly integral. Further, the abutting surfaces 63*a* and 63*b* of the core holder 11 are ground for finishing together with the side surface of the core half 15*b* to form an accurate single plane parallel to the gap 19. Thus, a recording head block has been formed.

Figure 6:
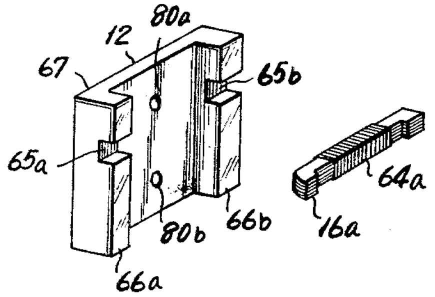

On the other hand, a core half 16*a* shown in FIG. 6 on which windings 64*a* are wound is inserted into recessed portions 65*a* and 65*b* of the core holder 12 and fixed thereto. The abutting surfaces 66*a* and 66*b* of the core holder 12 and a side surface 67 thereof are ground for finishing to form accurate parallel planes relative to each other. The left and right side surfaces of the core half 16*a* are also ground for finishing to form parallel planes. The core holder 12 is formed in the middle portion thereof with two tapped holes 80*a* and 80*b*.

Figure 7:
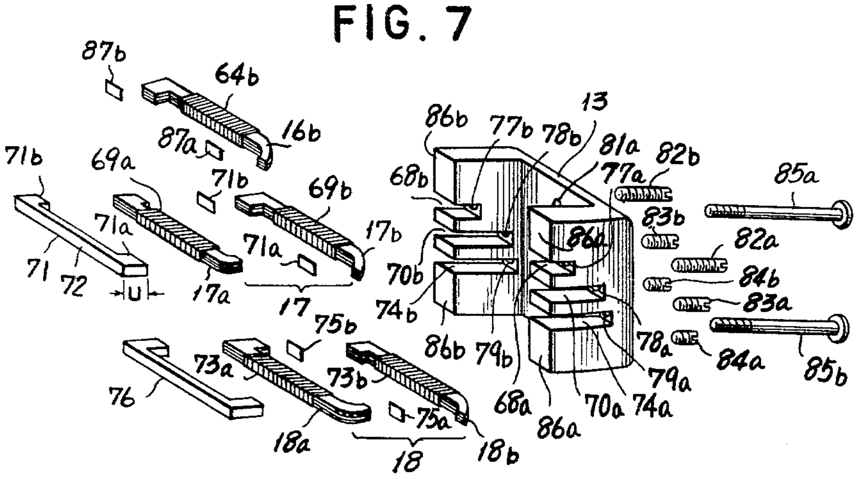
Figure 8:
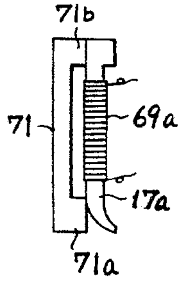
FIG. 8 is a plan view illustrating the state of engagement of a dummy block and a core half.

Nextly, a core half 16*b* shown in FIG. 7 on which windings 64*b* are wound is inserted into recessed portions 68*a* and 68*b* of the core holder 13. A core half 17*b* on which windings 69*b* are wound is inserted into recessed portions 70a and 70*b* of the core holder 13. A core half 17*a* on which windings 69*a* are wound is inserted into the recessed portions 70*a* and 70*b* through spacers 71*a* and 71b. Further, a dummy block 71 made of a material which has the same or nearly the same hardness as the core holder 13 is inserted into the recessed portions 70*a* and 70*b* and is pressed against the back side surface of the core half 17*a*. The end surfaces of the core abutting portions 71*a* and 71*b* of the dummy block 71 and the back side surface 72 thereof are finished so as to form accurate parallel planes. Since the left and right side surfaces of the core halves 17*a* and 17*b* are also finished to form accurate parallel planes, the back side surface 72 of the dummy block 71 becomes parallel with the gap formed between the core halves 17*a* and 17*b* through the spacer 71*a* when the dummy block 71 is pressed against the back side surface of the core half 17*a* as shown in FIG. 8. The depth of the recessed portions 70*a* and 70*b* is selected at a value which is slightly larger than the sum of the width of the head core 17 formed by abutting the core halves 17*a* and 17*b* together and the width U of the dummy block 71. Nextly, a core half 18*b* on which windings 73*b* are wound is inserted into recessed portions 74*a* and 74*b* of the head core 13. A core half 18*a* on which windings 73*a* are wound is inserted into the recessed portions 74*a* and 74*b* through spacers 75*a* and 75*b*. A dummy block 76 is inserted into the recessed portions 74*a* and 74 *b* and is pressed against the back side surface of the core half 18*a*. The respective side surfaces of the core halves 18*a*, 18*b* and the dummy block 76 have accurate parallel planes finished beforehand. The depth of the recessed portions 74*a* and 74*b* is selected at a value which is slightly larger than the sum of the width of the core 18 and the width of the dummy block 76. The core halves 16*a*, 17*a*, 17*b*, 18*a* and 18*b* and the dummy blocks 71 and 76 are temporarily fixed together in the state as described above by means of an instantaneous binder or the like.

Figure 9:
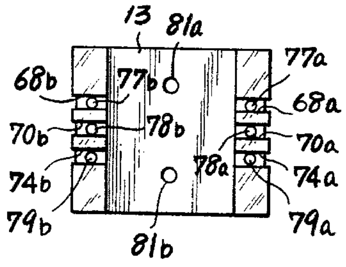
FIG. 9 is a side view showing a core holder half.

The core holder 13 is formed, as shown in FIG. 9, with tapped holes 77*a*, 77*b*, 78*a*, 78*b*, 79*a* and 79*b* extending from the side surface thereof to the recessed portions 68*a*, 68*b*, 70*a*, 70*b*, 74*a* and 74*b*. The core holder 13 is further formed in the central portion thereof opposite to the tapped holes 80*a* and 80*b* of the core holder 12 with tapped holes 81*a* and 81*b* which extends from the side surface of the core holder 13. Screws 82*a*, 82*b*, 83*a*, 83*b*, 84*a* and 84*b* are screwed into the tapped holes 77*a*, 77*b*, 78*a*, 78*b*, 79*a*, and 79*b* from the side surface of the core holder 13. The tips of these screws 82*a* to 84*b* push the side surfaces of the core halves 16*b*, 17*b* and 18*b* and adjust the positions of these cores halves. Therefore the positions of the gaps of the head cores 16, 17, 18 are adjusted. Then polyester resin is injected into the assembly for molding to make the core halves integral with the core holder 13. The abutting surfaces 86*a*, 86*b* of the core holder 13 are ground together with the side surfaces of the core half 16*b* and the dummy blocks 71 and 76 form an accurate single plane.

The abutting surfaces 66*a* and 66*b* of the core holder 12 which has been assembled in the manner described above with reference to FIG. 6 are caused to abut against the abutting surfaces 86*a* and 86*b* of the core holder 13 which has been assembled in the manner described above with reference to FIG. 7. At this stage, spacers 87*a* and 87*b* are interposed between the core halves 16a and 16b. Screws 85*a* and 85*b* are inserted from the side surface of the core holder 13 and screwed through the tapped holes 81*a* and 81*b* of the core holder 13 into the tapped holes 80*a* and 80*b* of the core holder 12. Thus, the core holders 12 and 13 are made integral to form a reproducing head block.

Figure 5:
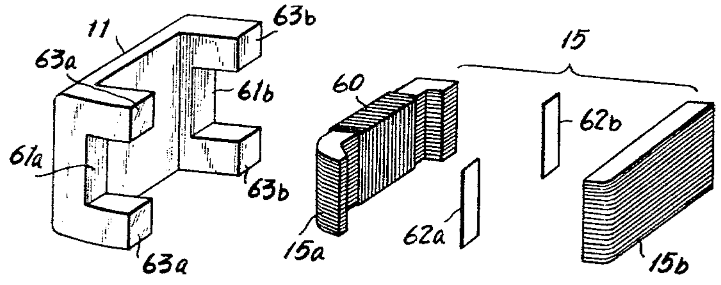
FIGS. 5 to 7 are respectively perspective views showing processes for manufacturing the magnetic head of the first embodiment shown in FIG. 1.

The reproducing head block thus formed and the recording head block made in the manner previously described with reference to FIG. 5 are assembled together in the single shield case 10 with the shield plate 14 interposed between them. These head blocks are fixed to the shield case 10 by means of screws or by injecting synthetic resin. The magnetic head as shown in FIG. 1 has now been completed.

According to the method of manufacture described above, the position of the gap of each head core is adjusted so that it is made parallel to the abutting surfaces of the core holder. Accordingly, the innermost surface of each recessed portion need not to be accurately made parallel to the gap. Further, widening of the gap is prevented by the screws.

While the invention has been described with respect to the specific and preferable embodiments, various modifications and variations thereof will be apparent to those skilled in the art without departing from the scope of which is set forth in the appended claims.

What we claim is:

1. A multi-head core magnetic head comprising at least three head cores held integrally together wherein at least one of said head cores has a gap of a relatively large gap width, and at least two other head cores have gaps which are parallel to the gap of said at least one head core and of width smaller than the gap width of said at least one head core, said at least two other head cores being disposed at positions at which the respective gap thereof traces a track made on a magnetic tape by the gap of said at least one head core and the distance between the gap of said at least one head core and the gaps of said at least two other head cores are respectively different from each other, further comprising a first core holder half half for holding said at least one head core, a second core holder half for holding said at least two other head cores, a third core holder half which abuts against said second core holder half, a shield plate held between said first and third core holder halves for shielding said at least one head core from said at least two other head cores, and a single shield case for containing said first to third core holder halves and said shield plate.

2. The multi-head core magnetic head as defined in claim 1 wherein said second core holder half has recessed portions of different depths for receiving said at least two other head cores, a dummy core in addition to the head core is inserted in the recessed portion other than one of the smallest depth and said second core holder half having said head cores and a dummy core inserted in said recessed portions has an abutting surface made in the form of a plane.

3. The multi-head core magnetic head as defined in claim 1 wherein one of said at least two other head cores has one head core half constituting the head core held by said second core holder and the other head core half by said third core holder, said second core holder having its abutting surface made in the form of a plane and said third core holder having its abutting surface abutting against said second core holder and the surface abutting against the shield plate on the opposite side thereof made in the form of planes which are parallel to each other.

4. The multi-head core magnetic head as defined in claim 1 wherein said second core holder is formed with tapped holes extending from its side surface to the innermost surface of said recessed portions and said head cores inserted in said recessed portions are pushed by the tips of screws screwed in said tapped holes for adjusting the positions of the gaps of said head cores.

* * * * *